(12) United States Patent
Döring (10) Patent No.: US 10,221,740 B2
(45) Date of Patent: Mar. 5, 2019

(54) EXHAUST GAS POST TREATMENT SYSTEM AND METHOD FOR EXHAUST GAS POST-TREATMENT

(71) Applicant: MAN DIESEL & TURBO SE, Augsburg (DE)

(72) Inventor: Andreas Döring, München/Unterhaching (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 15/310,387

(22) PCT Filed: May 21, 2015

(86) PCT No.: PCT/EP2015/001037
§ 371 (c)(1),
(2) Date: Nov. 10, 2016

(87) PCT Pub. No.: WO2015/180831
PCT Pub. Date: Dec. 3, 2015

(65) Prior Publication Data
US 2017/0268399 A1 Sep. 21, 2017

(30) Foreign Application Priority Data
May 27, 2014 (DE) .................. 10 2014 007 913

(51) Int. Cl.
*F01N 3/20* (2006.01)
*B01D 53/50* (2006.01)
(Continued)

(52) U.S. Cl.
CPC .......... *F01N 3/2073* (2013.01); *B01D 53/50* (2013.01); *B01D 53/58* (2013.01); *B01D 53/78* (2013.01);
(Continued)

(58) Field of Classification Search
CPC ...... F01N 3/2066; F01N 3/2073; F01N 3/208; F01N 13/004; F01N 2340/06;
(Continued)

(56) References Cited

U.S. PATENT DOCUMENTS 4,744,967 A 5/1988 Brand et al.
2008/0314033 A1* 12/2008 Aneja .................. F01N 3/033
60/297

(Continued)

FOREIGN PATENT DOCUMENTS

CN 102 364 068 2/2012
CN 103688033 3/2014
(Continued)

OTHER PUBLICATIONS

Office Action dated Sep. 8, 2017 which issued in the corresponding Korean Patent Application No. 10-2016-7022167.
(Continued)

*Primary Examiner* — Audrey K Bradley
(74) *Attorney, Agent, or Firm* — Cozen O'Connor (57) ABSTRACT

An exhaust gas post treatment system for an internal combustion engine, in particular a heavy fuel oil-powered engine, including an SCR catalyst, using ammonia as a reducing agent for the denitration of the exhaust gas, and a device positioned upstream of the SCR catalyst by which ammonia or an ammonia precursor substance, which is converted to ammonia, is introduced upstream of the SCR catalyst. Downstream of the SCR catalyst an exhaust gas scrubber is positioned, by which excess ammonia, contained in the exhaust gas leaving the SCR catalyst, together with sulfur oxides, can be scrubbed out of the exhaust gas forming ammonium salts while maintaining a pH value of approximately 6. For the control thereof, a bypass around
(Continued)

the SCR catalyst can be provided as a westgate, or comprising an additional SCR catalyst.

13 Claims, 5 Drawing Sheets (51) Int. Cl.
  *B01D 53/58* (2006.01)
  *B01D 53/78* (2006.01)
  *B01D 53/92* (2006.01)
  *B01D 53/94* (2006.01)
  *F02B 37/18* (2006.01)
  *F01N 3/04* (2006.01)
  *F01N 3/029* (2006.01)
  *F01N 13/00* (2010.01)

(52) U.S. Cl.
  CPC ......... *B01D 53/92* (2013.01); *B01D 53/9409* (2013.01); *B01D 53/9418* (2013.01); *F01N 3/029* (2013.01); *F01N 3/04* (2013.01); *F01N 3/2066* (2013.01); *F01N 13/004* (2013.01); *F02B 37/18* (2013.01); *F01N 2340/06* (2013.01); *F01N 2410/12* (2013.01); *F01N 2570/04* (2013.01); *F01N 2570/14* (2013.01); *F01N 2590/02* (2013.01); *F01N 2610/02* (2013.01); *F01N 2900/1616* (2013.01); *Y02T 10/24* (2013.01)

(58) Field of Classification Search
  CPC ............ F01N 2410/12; F01N 2570/14; F01N 2590/02; F01N 2610/02; B01D 53/50; B01D 53/58; B01D 53/78; B01D 53/92; B01D 53/9418; F02B 37/18
  See application file for complete search history.

(56) References Cited

U.S. PATENT DOCUMENTS

| | | |
|---|---|---|
| 2011/0131957 A1 | 6/2011 | Hepburn et al. |
| 2012/0117963 A1 | 5/2012 | Hepburn et al. |
| 2014/0000240 A1 | 1/2014 | Thogersen et al. |

FOREIGN PATENT DOCUMENTS

| | | |
|---|---|---|
| DE | 36 01 378 | 7/1987 |
| DE | 37 32 191 | 4/1989 |
| DE | 10 2008 041 530 | 3/2010 |
| DE | 102010063872 | 7/2011 |
| DE | 10 2010 042 419 | 4/2012 |
| DE | 10 2012 017 312 | 3/2014 |
| DE | 10 2013 012399 | 1/2015 |
| EP | 2 693 013 | 2/2014 |
| JP | H 04-502121 | 4/1992 |
| JP | 2001-187315 | 7/2001 |
| JP | 2005-125275 | 5/2005 |
| JP | 2011-132946 | 7/2011 |
| KR | 2014-0009457 | 1/2014 |
| WO | WO 90/04449 | 5/1990 |
| WO | WO 92/08541 | 5/1992 |
| WO | WO 2010/020684 | 2/2010 |
| WO | WO 2012/130375 | 10/2012 |
| WO | WO 2013/121081 | 8/2013 |

OTHER PUBLICATIONS

Office Action dated Jun. 19, 2017 which issued in the corresponding Japanese Patent Application No. 2016-551151.
Office Action dated Jul. 3, 2018 which issued in the corresponding Chinese Patent Application No. 201580027697.4.

* cited by examiner

EXHAUST GAS POST TREATMENT SYSTEM AND METHOD FOR EXHAUST GAS POST-TREATMENT

CROSS REFERENCE TO RELATED APPLICATIONS

This is a U.S. national stage of application no. PCT/EP2015/001037, filed on May 21, 2015. Priority is claimed on German Application No. DE102014007913.9, filed May 27, 2014, the content of which is incorporated herein by reference.

BACKGROUND OF THE INVENTION

1. Field of the Invention

The invention relates to an exhaust gas after-treatment system for an internal combustion engine, in particular for a marine diesel engine operated with heavy fuel oil. The invention furthermore relates to a method for the exhaust gas after-treatment of exhaust gas leaving an internal combustion engine, in particular a marine diesel engine operated with heavy fuel oil.

2. Description of the Prior Art

In the case of internal combustion engines operated with heavy fuel oil there is the possibility that the fuel used, i.e. the heavy fuel oil, has a high sulphur content. Sulphur oxides can react with other components of the exhaust gas and result in deposits that impair the effectiveness of the exhaust gas emission control. This is disadvantageous. There is a need for an exhaust gas after-treatment system for an internal combustion engine, which makes possible effective exhaust gas emission control even in the case of internal combustion engines operated with heavy fuel oil.

From DE 10 2004 027 593 A1 an internal combustion engine with exhaust gas turbocharging and exhaust gas emission control is known. The exhaust gas turbocharging is embodied either as single-stage or as two-stage exhaust gas turbocharging with an exhaust gas turbocharger or with two exhaust gas turbochargers. The exhaust gas emission control comprises an SCR catalytic converter, which in the case of the single-stage exhaust gas turbocharging, is positioned, seen in flow direction of the exhaust gas, either downstream of the turbine of the exhaust gas turbocharger or upstream of the turbine of the exhaust gas turbocharger. In the case of a two-stage exhaust gas turbocharging with a high-pressure exhaust gas turbocharger and a low-pressure exhaust gas turbocharger, the SCR catalytic converter is positioned between the high-pressure turbine of the high-pressure exhaust gas turbocharger and the low-pressure turbine of the low-pressure exhaust gas turbocharger.

An SCR catalytic converter of an exhaust gas after-treatment system uses ammonia as reduction agent for denitrifying the exhaust gases. In the case of exhaust gas after-treatment systems known from the prior art, ammonia is introduced into the exhaust gas upstream of the SCR catalytic converter either directly or an ammonia precursor substance, such as a watery urea solution, which in the exhaust gas flow is decomposed or evaporated to form steam, carbon dioxide, and ammonia. Here, according to practice, the quantity of the ammonia or of the ammonia precursor substance introduced into the exhaust gas upstream of the SCR catalytic converter is adjusted so that this quantity corresponds to the ammonia quantity that is convertible in the SCR catalytic converter, so that downstream of the SCR catalytic converter no ammonia is contained in the exhaust gas to avoid undesirable ammonia emissions.

SUMMARY OF THE INVENTION

Although it is possible with the help of an SCR catalytic converter to reduce nitric oxides in the exhaust, in particular nitrogen monoxide and nitrogen dioxide there is a need in particular for internal combustion engines operated with heavy fuel oil to reduce sulphur oxides in the exhaust gas in addition to nitrogen oxides to reduce sulphur oxide emissions of such internal combustion engines.

Starting out from this, one aspect of the invention is creating a new type of exhaust gas after-treatment system for an internal combustion engine and to a method for the exhaust gas after-treatment. This object is solved through an exhaust gas after-treatment system for an internal combustion engine. According to one aspect of the invention, an exhaust gas scrubber is positioned downstream of the SCR catalytic converter via which ammonia, which is contained in the exhaust gas leaving the SCR catalytic converter, which is likewise contained in the exhaust gas leaving the SCR catalytic converter, can be scrubbed out of the exhaust gas subject to forming ammonia salts.

In terms of the present invention, an exhaust gas scrubber is accordingly positioned downstream of the SCR catalytic converter. Here, a defined quantity of ammonia is contained in the exhaust gas downstream of the SCR catalytic converter, which together with sulphur oxides, can be scrubbed out of the exhaust gas in the region of the exhaust gas scrubber, namely subject to forming ammonia salts. Accordingly, the purpose of the present invention is to introduce an increased quantity of ammonia or an increased quantity of an ammonia precursor substance into the exhaust gas upstream of the SCR catalytic converter so that downstream of the SCR catalytic converter a defined ammonia quantity is contained in the exhaust gas that can be utilised in the exhaust gas scrubber to scrub sulphur oxides out of the exhaust gas subject to forming ammonia salts. Because of this, a desulphurisation of the exhaust gas in addition to the denitrification can also be simply provided, wherein for the desulphurisation as well as for the denitrification, ammonia is utilised. This allows a particularly effective denitrification and desulphurisation of the exhaust gas, more so since through the elevated quantity of ammonia in the SCR catalytic converter higher turnovers can be achieved during the denitrification.

Preferentially, the device positioned upstream of the SCR catalytic converter introduces the ammonia and/or the ammonia precursor substance into the exhaust gas in a quantity that is greater than the ammonia quantity that is convertible in the SCR catalytic converter, so that downstream of the SCR catalytic converter ammonia is contained in a quantity so that a ph value of the waste water of the exhaust gas scrubber containing the ammonia salts lies between 4 and 8. A particularly advantageous denitrification and desulphurisation of the exhaust gas is possible in this way.

According to a first advantageous further development, a bypass is provided via which an exhaust gas part flow downstream of the device, which serves for introducing the ammonia and/or the ammonia precursor substance into the exhaust gas, and upstream of the SCR catalytic converter from the exhaust gas subject to form an exhaust gas main flow, which can be conducted by way of the SCR catalytic converter, can be branched off, and subsequently fed to the exhaust gas conducted via the SCR catalytic converter downstream of the SCR catalytic converter and upstream of the exhaust gas scrubber.

According to a second alternative advantageous further development of the invention, a bypass is provided via which an exhaust gas part flow upstream of the device, which serves for introducing the ammonia and/or the ammonia precursor substance into the exhaust gas, and upstream of the SCR catalytic converter can be branched off the exhaust gas subject to forming an exhaust gas main flow, which can be conducted via the SCR catalytic converter, wherein the device which serves for introducing the ammonia and/or the ammonia precursor substance into the exhaust gas, is assigned to the bypass and introduces the ammonia and/or the ammonia precursor substance into the exhaust gas part flow, and wherein a first part of the exhaust gas part flow upstream of the SCR catalytic converter can be fed to the exhaust gas main flow and a second part of the exhaust gas part flow downstream of the SCR catalytic converter and upstream of the exhaust gas scrubber can be fed to the exhaust gas conducted via the SCR catalytic converter.

With both advantageous further developments it is possible to adjust or control the denitrification and desulphurisation to a certain degree independently of one another. Ultimately, the denitrification and desulphurisation of the exhaust gas can thereby be further improved.

Preferentially, in both the above first advantageous further development of the invention and also in the above second advantageous further development of the invention an SCR catalytic converter is arranged in the bypass, via which the exhaust gas part flow or part of the same fed to the exhaust gas downstream of the SCR catalytic converter and upstream of the exhaust gas scrubber can be conducted. The denitrification can thereby be further improved or the NOx turnovers on the SCR catalytic converter be adjusted independently of the ph value of the scrubber.

The exhaust gas is conducted downstream of the SCR catalytic converter via an exhaust gas scrubber, via which ammonia contained in the exhaust gas leaving the SCR catalytic converter, together with sulphur oxides likewise contained in the exhaust gas leaving the SCR catalytic converter are scrubbed out of the exhaust gas subject to forming ammonia salts. The method according to the invention allows a particularly advantageous denitrification and desulphurisation of exhaust gas in each case subject to utilising ammonia.

According to an advantageous further development, different ammonia concentrations are adjusted via an inlet cross section of the SCR catalytic converter so that preferentially an equipartition index of the ammonia downstream of the SCR catalytic converter lies below 0.8. The desulphurisation in the exhaust gas scrubber and also the denitrification in the SCR catalytic converter can thereby further improved.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The present invention relates to an exhaust gas after-treatment system for an internal combustion engine, in particular for a marine diesel engine operated with heavy fuel oil. Furthermore, the invention relates to a method for the exhaust gas after-treatment on such an internal combustion engine.

Figure 1:
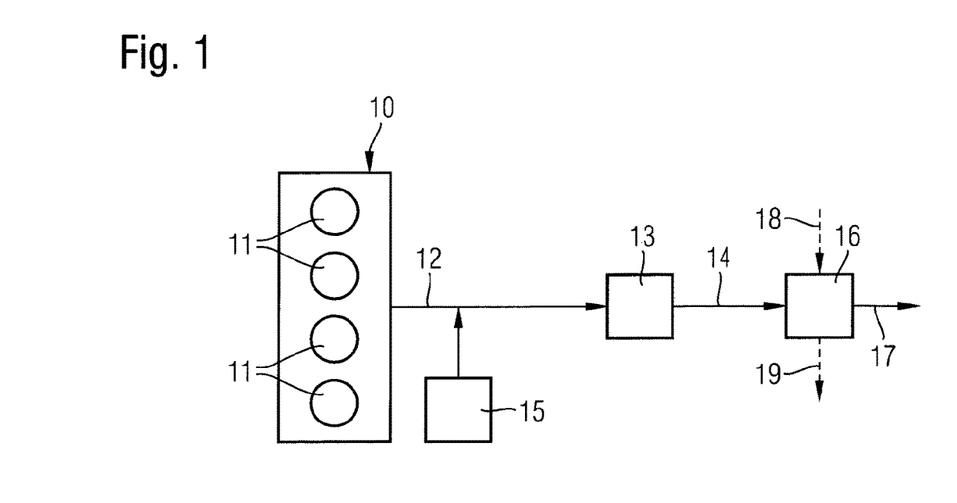
FIG. 1 is a schematic representation of an exhaust gas after-treatment system for an internal combustion engine according to the invention.

FIG. 1 shows, in a highly schematic manner, an internal combustion engine 10 with multiple cylinders 11. Exhaust gas 12, which leaves the internal combustion engine 10, is conducted via an exhaust gas after-treatment system located downstream of the internal combustion engine 10, which comprises an SCR catalytic converter 13. Accordingly, the exhaust gas 12 leaving the internal combustion engine 10 is fed to the SCR catalytic converter 13 as untreated exhaust gas 12 and leaves the SCR catalytic converter 13 as at least partially treated exhaust gas 14. In the SCR catalytic converter 13, a reduction agent is required for the exhaust gas emission control, namely for denitrifying the exhaust gas 12, wherein as reduction agent ammonia is utilised. The $NH_3$ precursor substance urea, carbamide, guanidium-formiate can also be employed.

The ammonia needed for the exhaust gas emission control in the SCR catalytic converter 13 can be added in metered quantity to the untreated exhaust gas 12 upstream of the SCR catalytic converter 13 with the help of a device 15, namely either directly as ammonia or as ammonia precursor substance, which is then converted into ammonia in the exhaust gas.

In particular when ammonia is added to the exhaust gas 12 leaving the internal combustion engine 10 is the device 15 an ammonia generator.

In particular when an ammonia precursor substance is added in metered quantity to the exhaust gas 12, the device 15 preferentially has a nozzle with the help of which the ammonia precursor substance, in particular urea, is injected into the exhaust gas 12. The urea is then evaporated in the exhaust gas upstream of the SCR catalytic converter 13 to form steam, carbon dioxide, and ammonia.

In the SCR catalytic converter 13, the exhaust gas 12 leaving the internal combustion engine 10 is denitrified subject to using the ammonia so that accordingly in the exhaust gas 14, nitrogen oxides are removed from the exhaust gas downstream of the SCR catalytic converter 13.

According to the invention, an exhaust gas scrubber 16 is positioned downstream of the SCR catalytic converter 13. By way of the exhaust gas scrubber 16, ammonia, which is contained in the exhaust gas 14 leaving the SCR catalytic converter 13, can be scrubbed out of the exhaust gas together with sulphur oxides, which are likewise contained in the exhaust gas 14 leaving the SCR catalytic converter 13, subject to forming ammonia salts.

Accordingly, exhaust gas 17, which has been subjected to both denitrification and desulphurisation and from which sulphur oxides and nitrogen oxides have accordingly been removed, is present downstream of the exhaust gas scrubber 16.

Accordingly, the exhaust gas 14 leaving the SCR catalytic converter 13 and on the other hand as so-called scrubbing agent 18, preferentially water is fed to the exhaust gas scrubber 16, wherein on the one hand the desulphurised exhaust gas 17 and on the other hand waste water 19 enriched with ammonia salts leave the exhaust gas scrubber.

It is therefore in the interest of the present invention to utilise the device 15 positioned upstream of the SCR catalytic converter 13 in such a manner that via the same, ammonia and/or an ammonia precursor substance is introduced into the exhaust gas in a quantity that is greater than the ammonia quantity that is convertible in the SCR catalytic converter 13. Accordingly, ammonia is present in the exhaust gas 14 downstream of the SCR catalytic converter 13 in a quantity that can be utilised in the exhaust gas scrubber 16 in order to scrub sulphur oxides out of the exhaust gas 14 for the desulphurisation of the same subject to forming ammonia salts.

Here, the device 15 positioned upstream of the SCR exhaust gas 13 introduces the ammonia and/or the ammonia precursor substance into the exhaust gas 12 in a quantity so that downstream of the SCR catalytic converter 13 ammonia is contained in the exhaust gas 14 in a quantity so that the ph value of the waste water 19 of the exhaust gas scrubber 16 lies between 4 and 8, preferably between 5 and 7, particularly preferably between 5.5 and 6.5. This can be established via a regulating circuit, in which the ph value of the waste water 19 is measured, compared with a set value and independently thereof the device 15 subject to adapting the quantity of ammonia and/or of the ammonia precursor substance introduced into the exhaust gas from the device is activated so that the measured ph value is approximately the set point value.

With the invention, effective desulphurisation and denitrification of exhaust gas, in particular for a marine diesel engine operated with heavy fuel oil is possible, wherein both for denitrification and also for the desulphurisation ammonia as operating substance is used in each case. Through the increased quantity of the ammonia that is available for the denitrification in the region of the SCR catalytic converter 13 a particularly effective denitrification of the exhaust gas is possible in the region of the SCR catalytic converter 13. The ammonia that is contained in the exhaust gas 14 downstream of the SCR catalytic converter 13 is utilised in the region of the exhaust gas scrubber 16 for the desulphurisation of the exhaust gas.

Figure 2:
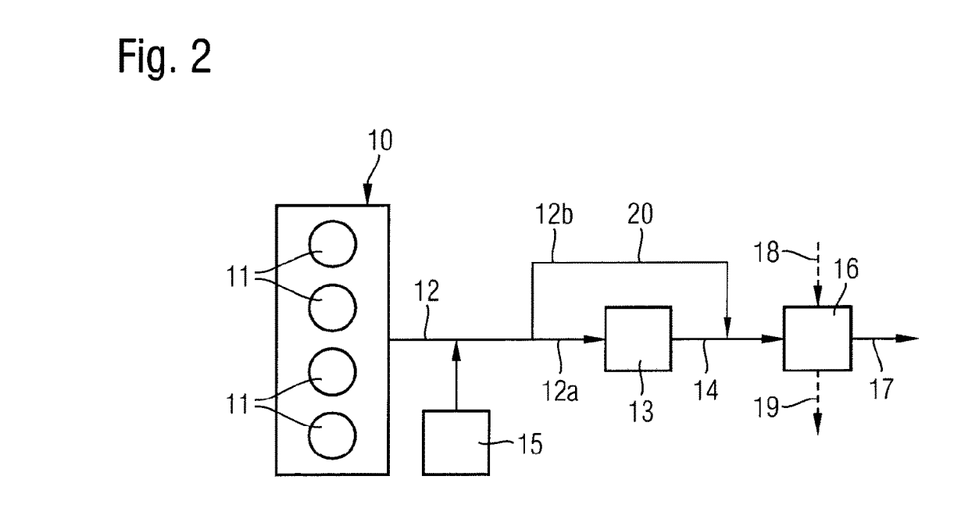
FIG. 2 is a schematic representation of an exhaust gas after-treatment system for an internal combustion engine according to the invention.

FIG. 2 shows a further development of the exemplary embodiment of FIG. 1, wherein the exemplary embodiment of FIG. 2 differs from the exemplary embodiment of FIG. 1 merely in that the exhaust gas after-treatment system of FIG. 2 comprises a bypass 20. By way of the bypass 20, exhaust gas can be branched off from the exhaust gas 12 subject to forming an exhaust gas main flow 12a and an exhaust gas part flow 12b upstream of the SCR catalytic converter 13 and downstream of the device 15, which serves for introducing the ammonia and/or the ammonia precursor substance into the exhaust gas 12, wherein the exhaust gas main flow 12a is conducted via the SCR catalytic converter 14, and wherein the exhaust gas part flow 12b is conducted past the SCR catalytic converter 13 via the bypass 20.

Downstream of the SCR catalytic converter 13 the exhaust gas part flow 12b conducted past the same can be united with the exhaust gas flow 14 leaving the SCR catalytic converter 13 in order to be then conducted jointly via the exhaust gas scrubber 16. The denitrification in the SCR catalytic converter 13 and the desulphurisation in the exhaust gas scrubber 14 can thereby be adjusted or controlled to a certain degree independently of one another.

Figure 3:
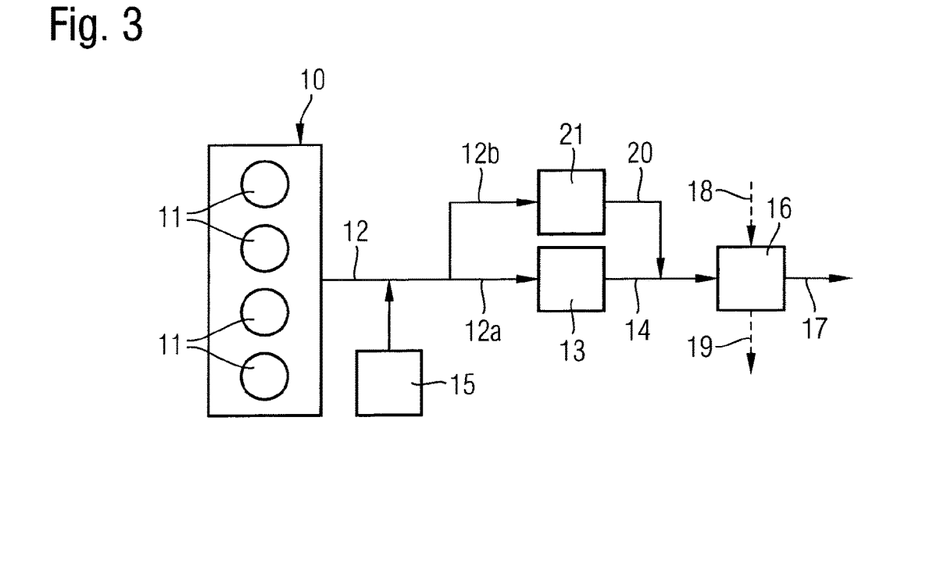
FIG. 3 is a schematic representation of an exhaust gas after-treatment system for an internal combustion engine according to the invention.

FIG. 3 shows a further development of the exemplary embodiment of FIG. 2, in which in the bypass 20 a further SCR catalytic converter 21 is positioned in order to also conduct the exhaust gas part flow 12b upstream of the exhaust gas scrubber 16 via its own SCR catalytic converter 21 for denitrification. This can further improve the denitrification of the exhaust gas.

Figure 4:
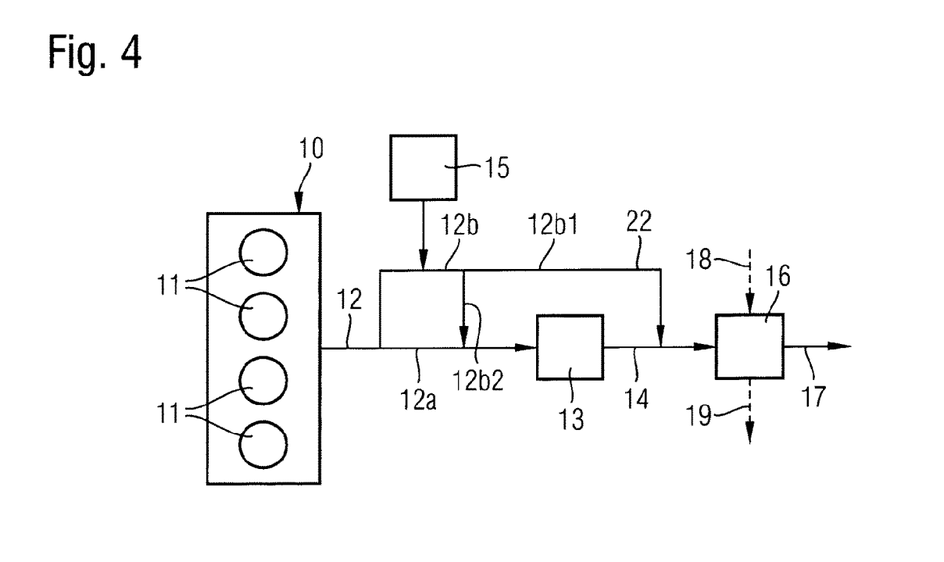
FIG. 4 is a schematic representation of an exhaust gas after-treatment system for an internal combustion engine according to the invention.

A further version of the invention is shown by FIG. 4, wherein in the exemplary embodiment of FIG. 4 the exhaust gas after-treatment system also comprises a bypass 22. In the exemplary embodiment of FIG. 4, the exhaust gas 12 can be again divided, via the bypass 22, into an exhaust gas main flow 12a and an exhaust gas part flow 12b, wherein the exhaust gas main flow 12a is mandatorily conducted via the SCR catalytic converter 13.

In contrast with the exemplary embodiments of FIGS. 2 and 3 however it is provided in the exemplary embodiment of FIG. 4 that the device 15, which serves for introducing the ammonia and/or the ammonia precursor substance into the exhaust gas, is assigned to the bypass 22 so that accordingly the bypass 22 divides the exhaust gas upstream of the device 15 into the exhaust gas main flow 12a and the exhaust gas part flow 12b. The device 15 introduces the ammonia and/or the ammonia precursor substance into the exhaust gas part flow 12b, wherein the exhaust gas part flow 12b is divided into two parts 12b1 and 12b2 downstream of the device 15.

The part 12b1 of the exhaust gas part flow 12b is conducted past the SCR catalytic converter 13 and downstream of the SCR catalytic converter 13 as well as upstream of the exhaust gas scrubber 16 mixed with the exhaust gas 14 that leaves the SCR catalytic converter 13.

The part 12b2 of the exhaust gas part flow 12b is mixed upstream of the SCR catalytic converter 13 with the exhaust gas main flow 12a and together with the exhaust gas main flow 12a conducted via the SCR catalytic converter 13.

Figure 5:
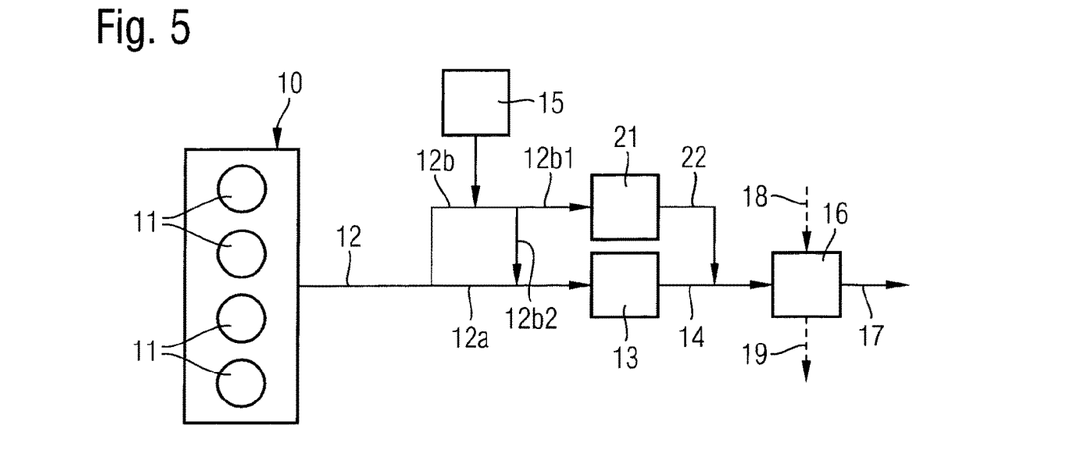
FIG. 5 is a schematic representation of an exhaust gas after-treatment system for an internal combustion engine according to the invention.

FIG. 5 shows a further development of the exemplary embodiment of FIG. 4, in which in agreement with the exemplary embodiment of FIG. 3, a further SCR catalytic converter 21 is fed to the bypass 22, via which in the exemplary embodiment of FIG. 5 the part 12b1 of the exhaust gas part flow 12b is conducted.

Figure 6:
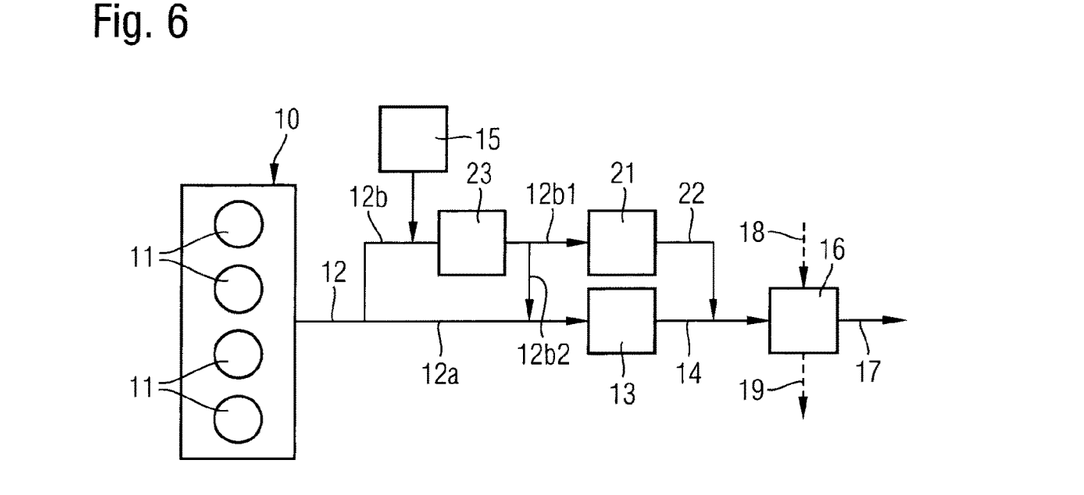
FIG. 6 is a schematic representation of an exhaust gas after-treatment system for an internal combustion engine according to the invention.

FIG. 6 shows a further development of the exemplary embodiment of FIG. 5, in which a hydrolysis catalytic converter 23 is assigned to the bypass 22 downstream of the device 15, which in the exemplary embodiment of FIG. 6 serves for adding a metered quantity of an ammonia precursor substance to the exhaust gas part flow 12b. By way of the hydrolysis catalytic converter 23, the conversion of the ammonia precursor substance into ammonia in the exhaust gas part flow 12b can be improved or promoted. Dividing the exhaust gas part flow 12b into the two parts 12b1 and 12b2 takes place downstream of the hydrolysis catalytic converter 23.

Figure 7:
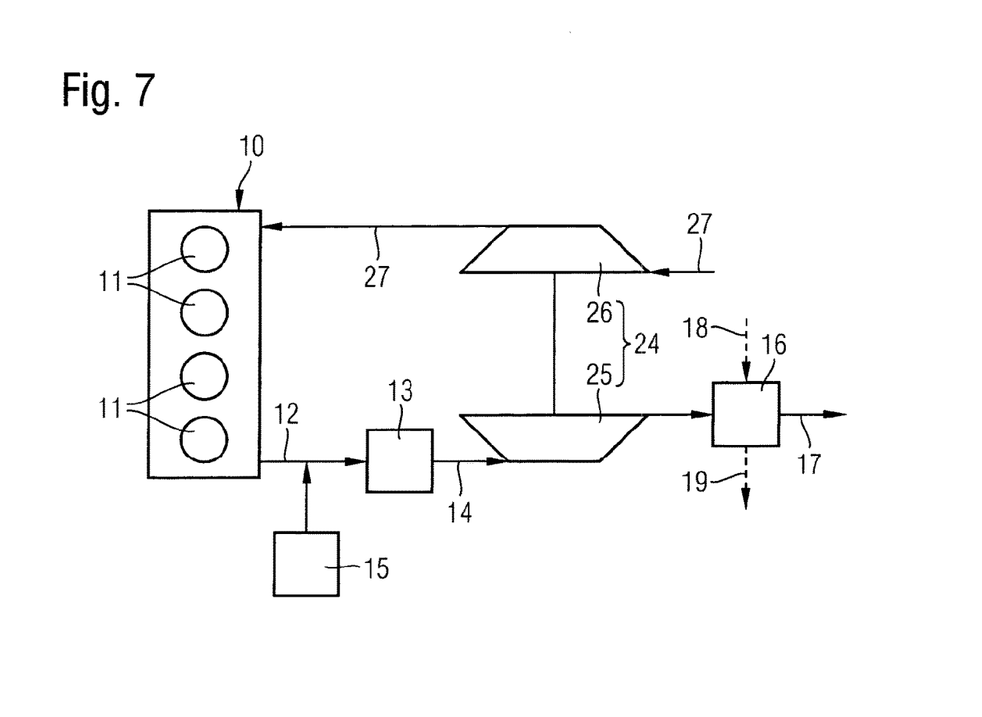
FIG. 7 is a schematic representation of an exhaust gas after-treatment system for an internal combustion engine according to the invention.
Figure 8:
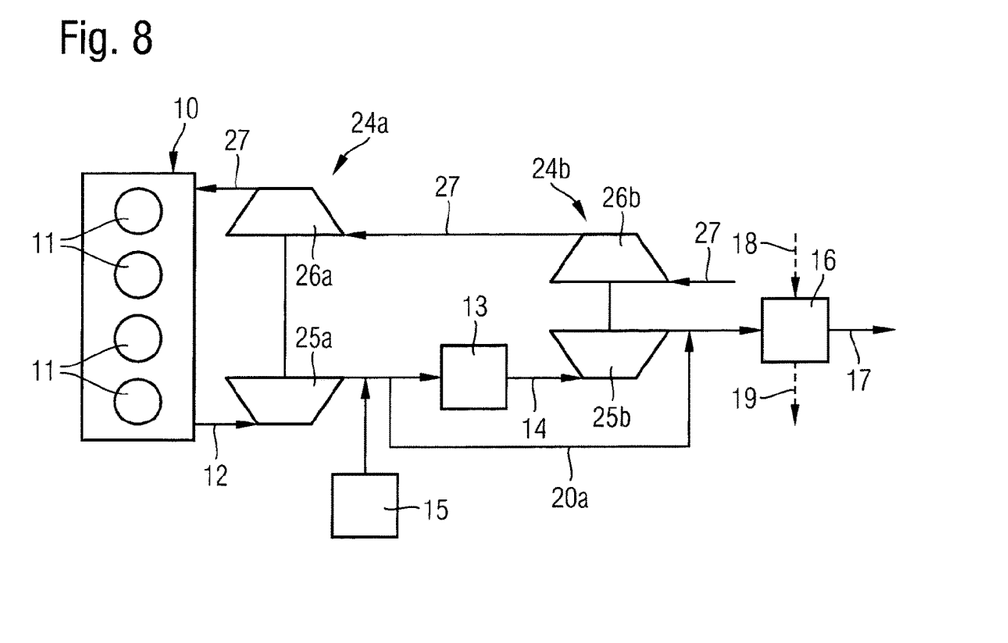
FIG. 8 is a schematic representation of an exhaust gas after-treatment system for an internal combustion engine according to the invention.

FIGS. 7 and 8 show two exemplary embodiments of the invention, with which the version of FIG. 1 is employed with an exhaust gas supercharged internal combustion engine. Accordingly, FIG. 7 shows an internal combustion engine 10 with a single-stage exhaust gas supercharging device via a single exhaust gas turbocharger 24, wherein of the exhaust gas turbocharger 24 a turbine 25 and a compressor 26 are shown. In FIG. 7, the SCR catalytic converter 13 including the device 15, which serves for adding the ammonia and/or the ammonia precursor substance in metered quantity to the exhaust gas 12, is arranged upstream of the turbine 25 of the exhaust gas turbocharger 24, but the exhaust gas scrubber 16 is positioned downstream of the turbine of the exhaust gas turbocharger 24. Because of the high pressures and temperatures upstream of the turbine 25, the denitrification of the exhaust gas in the region of the SCR catalytic converter 13 is promoted. Energy extracted in the turbine 25 during the expansion of the denitrified exhaust gas 14 is utilised in order to compress charge air 27 to be fed to the internal combustion engine 10 in the region of the compressor 26 of the exhaust gas turbocharger 24.

FIG. 8 shows a version of an internal combustion engine 10 with a two-stage exhaust gas supercharging device, which accordingly comprises two exhaust gas turbochargers 24a, 24b. The exhaust gas turbocharger 24a is a high-pressure exhaust gas turbocharger and the exhaust gas turbocharger 24b is a low-pressure exhaust gas turbocharger. In FIG. 8, the SCR catalytic converter 13 and the device 15 for introducing the ammonia or the ammonia precursor substance into the exhaust gas 12 are arranged downstream of the high-pressure turbine 25a of the high-pressure turbocharger 24a and upstream of the low-pressure turbine 25b of the low-pressure turbocharger 24b, whereas the exhaust scrubber 16 is arranged downstream of the low-pressure turbine 25b of the low-pressure turbocharger 24b. Energy extracted in the exhaust gas turbochargers 24a, 24b during the expansion of the exhaust gas in the region of the turbines 24a, 25b is utilised in order to compress the charge air 27 to be fed to the internal combustion engine 10 in two stages, namely in the region of the low-pressure compressor 26b and of the high-pressure compressor 26a of low-pressure exhaust gas turbocharger 24b and high-pressure turbocharger 24a.

It is pointed out here that the versions of FIGS. 2 to 6 can each be utilised also combined with an internal combustion engine 10 that is supercharged in a single stage or in two stages. Then, corresponding to the exemplary embodiments of FIGS. 7 and 8, the SCR catalytic converters 13 and if applicable 21 including the bypasses 20, 22 are positioned upstream of a turbine 25 and 25b respectively of an exhaust gas turbocharger 24 and 24b respectively, whereas the exhaust gas scrubbers 16 are positioned downstream of the respective turbine 25, 25b of the respective exhaust gas turbocharger 24, 24b.

In the exemplary embodiments of the FIGS. 1 to 8, the ammonia or the ammonia precursor substance is introduced into the exhaust gas via the device 15 in such a manner that, via the inlet cross section of the one or each SCR catalytic converter 13 or 21, a uniform ammonia concentration is adjusted.

Figure 9:
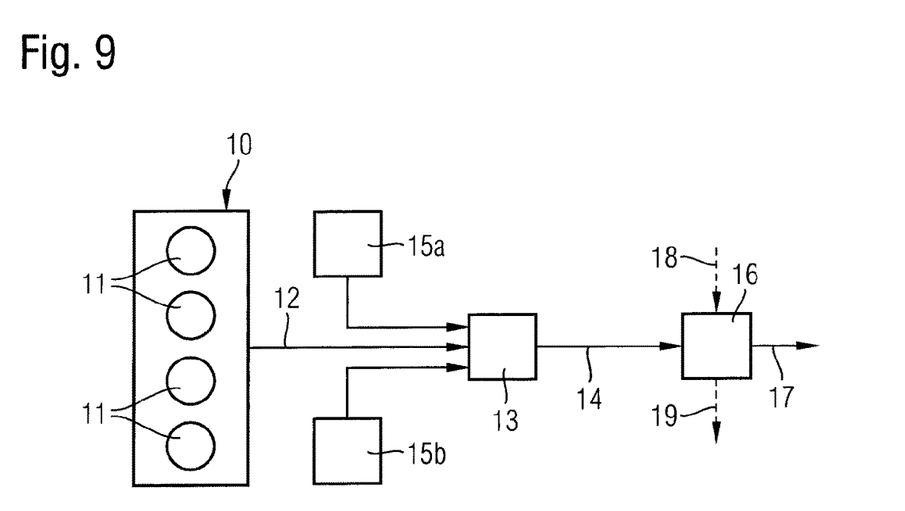
FIG. 9 is a schematic representation of an exhaust gas after-treatment system for an internal combustion engine according to the invention.

In contrast with this, FIG. 9 shows a further development of the exemplary embodiment of FIG. 1, in which via the inlet cross section of the SCR catalytic converter 13 different ammonia concentrations are adjusted. Accordingly, two devices 15a, 15b are shown in FIG. 9, which in each case serve for introducing ammonia or an ammonia precursor substance into the exhaust gas 12 leaving the internal combustion engine 10 upstream of the SCR catalytic converter 13, namely in such a manner that via the inlet cross section of the SCR catalytic converter a different ammonia concentration is adjusted. This can be ensured for example in that the two devices 15a, 15b introduce the ammonia or the ammonia precursor substance into the exhaust gas 12 with a different mass flow, as shown in FIG. 9, directly in the inlet region of the SCR catalytic converter 13. Here, the adjustment of an ammonia concentration that is different over the inlet cross section of the SCR catalytic converter 13 preferentially in such a manner that downstream of the SCR catalytic converter 13 in the exhaust gas 14 leaving the SCR catalytic converter 13 and accordingly upstream of the exhaust gas scrubber 16 an equipartition index of the ammonia lies below 0.8, preferably below 0.7, particularly preferably below 0.6.

The equipartition index of ammonia downstream of the SCR catalytic converter can be determined according to the following equations:

$$\gamma = 1 - 0.5 * \bar{\omega}$$

$$\bar{\omega} = \frac{1}{n} * \sum_{i=1}^{n} \omega_i$$

$$\omega_i = \frac{1}{\bar{c}} * \sqrt{(c_i - \bar{c})^2}$$

$$\bar{c} = \frac{1}{n} * \sum_{i=1}^{n} c_i.$$

wherein the equipartition index of the ammonia is downstream of the SCR catalytic converter 13, wherein $c_i$ is the ammonia concentration at the $i^{th}$ measurement point upstream of the SCR catalytic converter 13, and wherein n is the total number of the measurement points downstream of the SCR catalytic converter 13.

It is therefore in the interest of the present invention for the exhaust gas emission control of an internal combustion engine 10, in particular of an internal combustion engine operated with heavy fuel oil, for the denitrification and desulphurisation to utilise ammonia in each case, wherein the denitrification takes place in an SCR catalytic converter 13 and the desulphurisation in an exhaust gas scrubber 16 downstream thereof. Here, the SCR catalytic converter 13 is operated with excess ammonia so that downstream of the SCR catalytic converter 13 and upstream of the exhaust gas scrubber 16 a defined ammonia quantity is present which can be utilised for the desulphurisation in the exhaust gas scrubber 16.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An exhaust gas after-treatment system for an internal combustion engine, comprising:
   an SCR catalytic converter configured for denitrification of exhaust gas that utilizes ammonia as a reduction agent;
   a device arranged upstream of the SCR catalytic converter in flow direction of the exhaust gas, and configured to introduce the ammonia and/or an ammonia precursor substance into the exhaust gas upstream of the SCR catalytic converter, which is converted in the exhaust gas to form the ammonia, wherein the device is configured to introduce the ammonia and/or the ammonia precursor substance such that downstream of the SCR catalytic converter a pH value of waste water of an exhaust gas scrubber is between 4 and 8; and
   the exhaust gas scrubber positioned downstream of the SCR catalytic converter, via which the ammonia, which is contained in the exhaust gas leaving the SCR catalytic converter, together with sulphur oxides, which are contained in the exhaust gas leaving the SCR catalytic converter, are scrubbed out of the exhaust gas subject by forming ammonia salts; and
   a bypass, configured as a turbocharger waste gate, via which an exhaust gas part flow is branched off the exhaust gas having an inlet downstream of the device and upstream of the SCR catalytic converter and an outlet downstream of the SCR catalytic converter and upstream of the exhaust gas scrubber.

2. The exhaust gas after-treatment system according to claim 1, further comprising an additional SCR catalytic converter arranged in the bypass.

3. The exhaust gas according to claim 1, wherein the internal combustion engine is a marine diesel engine operated with heavy fuel oil.

4. The exhaust gas according to claim 1,
   wherein the device is configured to introduce the ammonia and/or the ammonia precursor substance into the exhaust gas in a quantity that is greater than an ammonia quantity that is convertible in the SCR catalytic converter.

5. The exhaust gas according to claim 4,
   wherein the device introduces the ammonia and/or the ammonia precursor substance into the exhaust gas in a quantity so that the pH value of the waste water lies between one of:
   5 and 7, and
   5.5 and 6.5.

6. The exhaust gas after-treatment system according to claim 1, further comprising:
   a turbine of an exhaust gas turbocharger, wherein the device for introducing the ammonia and/or the ammonia precursor substance into the exhaust gas is positioned upstream of the turbine of the exhaust gas turbocharger and the exhaust gas scrubber is arranged downstream of the turbine of the exhaust gas turbocharger.

7. The exhaust gas after-treatment system according to claim 6, wherein the SCR catalytic converter is arranged upstream of the turbine of the exhaust gas turbocharger.

8. An exhaust gas after-treatment system, comprising:
   an SCR catalytic converter configured for denitrification of exhaust gas that utilizes ammonia as a reduction agent;
   a device arranged upstream of the SCR catalytic converter in flow direction of the exhaust gas, and configured to introduce the ammonia and/or an ammonia precursor substance into the exhaust gas upstream of the SCR catalytic converter, which is converted in the exhaust gas to form the ammonia;
   an exhaust gas scrubber positioned downstream of the SCR catalytic converter, via which the ammonia, which is contained in the exhaust gas leaving the SCR catalytic converter, together with sulphur oxides, which are contained in the exhaust gas leaving the SCR catalytic converter, are scrubbed out of the exhaust gas subject by forming ammonia salts; and
   a bypass having an inlet upstream of the SCR catalytic converter, a first outlet upstream of the SCR catalytic converter, and a second outlet downstream of the SCR catalytic converter,
   wherein the device is arranged to introduce the ammonia and/or the ammonia precursor substance into the bypass upstream of the first outlet, and
   wherein a first part of an exhaust gas part flow upstream of the SCR catalytic converter can be fed to an exhaust gas main flow and a second part of an exhaust gas part flow downstream of the SCR catalytic converter and upstream of the exhaust gas scrubber can be fed to the exhaust gas conducted via the SCR catalytic converter.

9. The exhaust gas after-treatment system according to claim 8, further comprising an additional SCR catalytic converter arranged in the bypass.

10. A method for the exhaust gas after-treatment of exhaust gas leaving an internal combustion engine, comprising:
    denitrification of the exhaust gas via an SCR catalytic converter that utilizes ammonia as reduction agent;
    introducing the ammonia and/or an ammonia precursor substance, which is converted in the exhaust gas to form the ammonia, into the exhaust gas upstream of the SCR catalytic converter, wherein downstream of the SCR catalytic converter a pH value of waste water of an exhaust gas scrubber is between 4 and 8; and
    scrubbing via the exhaust gas scrubber the exhaust gas downstream of the SCR catalytic converter, via which the ammonia and sulphur oxides contained in the exhaust gas leaving the SCR catalytic converter are scrubbed out of the exhaust gas by forming ammonia salts,
    branching off an exhaust gas part flow of the exhaust gas via a bypass, configured as a turbocharger waste gate, wherein the bypass has an inlet downstream of where the ammonia and/or an ammonia precursor substance is introduced and upstream of the SCR catalytic converter and an outlet downstream of the SCR catalytic converter and upstream of the exhaust gas scrubber.

11. The method according to claim 10, wherein different ammonia concentrations are adjusted via an inlet cross section of the SCR catalytic converter.

12. The method according to claim 11, wherein an equipartition index of the ammonia downstream of the SCR catalytic converter lies below 0.8.

13. The method according to claim 12, wherein the equipartition index of the ammonia downstream of the SCR catalytic converter lies below 0.7 and/or 0.6.

* * * * *